(No Model.)

W. SELLERS.
CAMPAIGN HORN.

No. 403,702. Patented May 21 1889.

Witnesses.
F.D. Withnell
J.H. Reid

Inventor.
William Sellers
by E. Planta.
Attorney.

UNITED STATES PATENT OFFICE.

WILLIAM SELLERS, OF HAVERHILL, MASSACHUSETTS.

CAMPAIGN-HORN.

SPECIFICATION forming part of Letters Patent No. 403,702, dated May 21, 1889.

Application filed July 23, 1888. Serial No. 280,757. (No model.)

*To all whom it may concern:*

Be it known that I, WILLIAM SELLERS, a citizen of the United States, residing at Haverhill, in the county of Essex and State of Massachusetts, have invented certain new and useful Improvements in Campaign-Horns, of which the following, taken in connection with the accompanying drawings, is a specification.

The object of my invention is to produce a campaign-horn that can be operated by hand so as to produce long or short intermittent sounds.

The invention consists of two short cylinders, each provided with a horn and connected together by means of a bar on each side, but with a space between the inner ends of the cylinders equal to about the length of one of them. Upon these end cylinders is mounted a sliding cylinder provided in its center with a diaphragm and connected to each end cylinder by means of elastic cylinders, all as hereinafter fully set forth, and pointed out in the claims.

Figure 1:
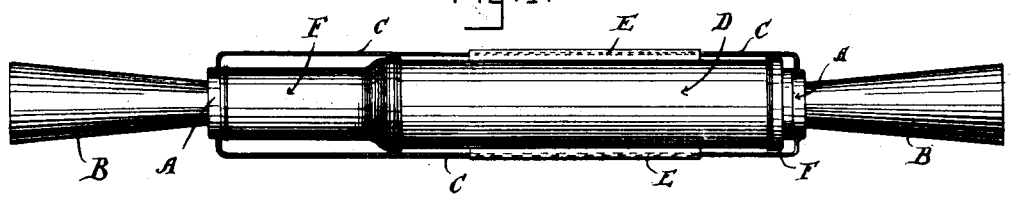
Figure 2:
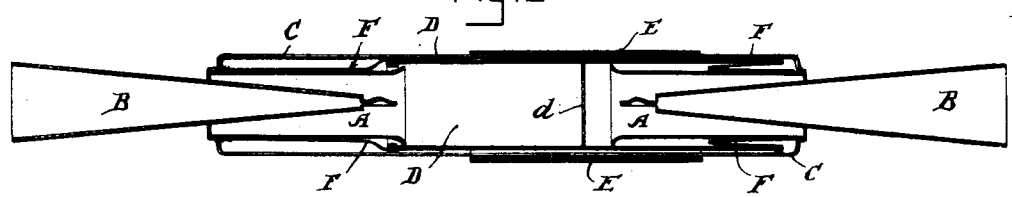
Figure 3:
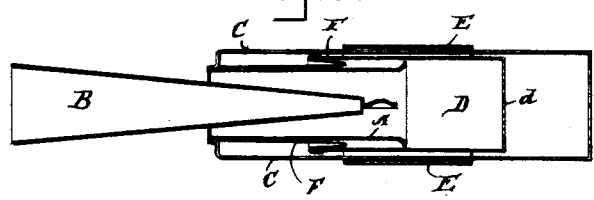

Referring to the accompanying drawings, Figure 1 represents a side view of a campaign-horn embodying my invention. Fig. 2 is a longitudinal section through the same. Fig. 3 is a modification showing a single horn.

A A represent the end cylinders, each fitted with a horn, B, and connected together on each side by a bar, C.

D is a cylinder mounted upon the end cylinders, A A, and provided in its center with a diaphragm, *d*. The ends of the cylinders A are made flaring, so as to just fit the cylinder D and form bearings upon which it slides, and the cylinder D is also provided on each side with guides E, through which the bars C pass. The cylinder D is connected at each end to the cylinders A by means of an elastic cylinder, F, secured by a cord at one end to the cylinder A and at the other end to the cylinder D, so that when the cylinder is pushed to one end or the other one of the elastic cylinders F will fold between the two cylinders, and when pushed in the reverse direction will be unfolded.

It will be seen that as the cylinder D is pushed backward and forward on the cylinder A air will be drawn in through one of the horns, while by the diaphragm *d* air will be expelled through the other horn, thereby producing a sound, and so that by operating the tube D quickly long sounds are produced, or if operated by a series of jerks in either direction short intermittent sounds are produced; and by reason of the elastic cylinders F a perfectly-tight joint is formed between the ends of the cylinder D and cylinders A, while at the same time there is no friction, so that the tube D works very easily and smoothly.

In the modification shown in Fig. 3 the arrangement and operation are as before described, only, instead of having a diaphragm in the center of the cylinder D, it is at its end, and the guide-rod C is one continuous piece, as shown, and by means of which the horn could be attached to the end of a torchlight or other staff.

What I claim as my invention is—

1. A campaign-horn consisting of two short cylinders, each provided with a horn and connected together by a bar on each side and an outer cylinder provided with a central diaphragm and connected to the end cylinders by elastic cylinders in such manner that one folds upon itself and the other unfolds when the movable cylinder is pushed in one direction, and vice versa when the cylinder is pushed in the opposite direction, substantially as shown and described.

2. The cylinders A A, connected together by bars C C, and each provided with a horn, B, in combination with a sliding cylinder, D, provided with a diaphragm, *d*, and guides E, and the elastic cylinders F, secured at one end to the cylinder D and at the other end to the cylinders A, substantially as and for the purposes set forth.

3. In combination with the cylinders A and cylinder D, the elastic cylinder F, whereby the space between the cylinders is air-tight, and yet one is free to slide upon the other without friction, substantially as set forth.

4. In a campaign-horn, a cylinder provided with a horn and a movable cylinder provided with a diaphragm, the two cylinders being connected together by an elastic cylinder in such manner that it folds upon itself when the movable cylinder is pushed in one direction and unfolds when pushed in the opposite direction, substantially as set forth.

In testimony whereof I have signed my name to this specification, in the presence of two subscribing witnesses, on this 18th day of July, A. D. 1888.

WILLIAM SELLERS.

Witnesses:
L. W. HOWES,
E. PLANTA.